Aug. 24, 1948.　　　A. BERTEA　　　2,447,729
CHECK VALVE
Filed May 5, 1945　　　2 Sheets-Sheet 1
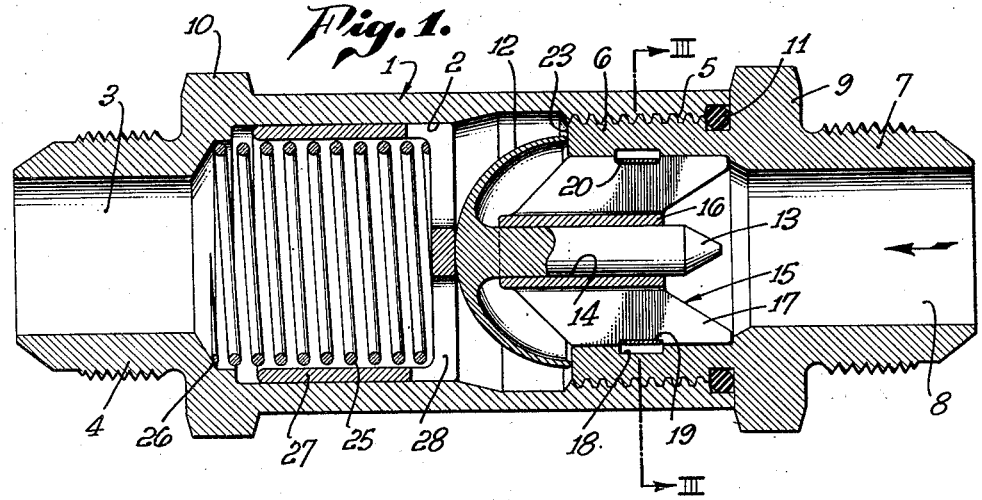
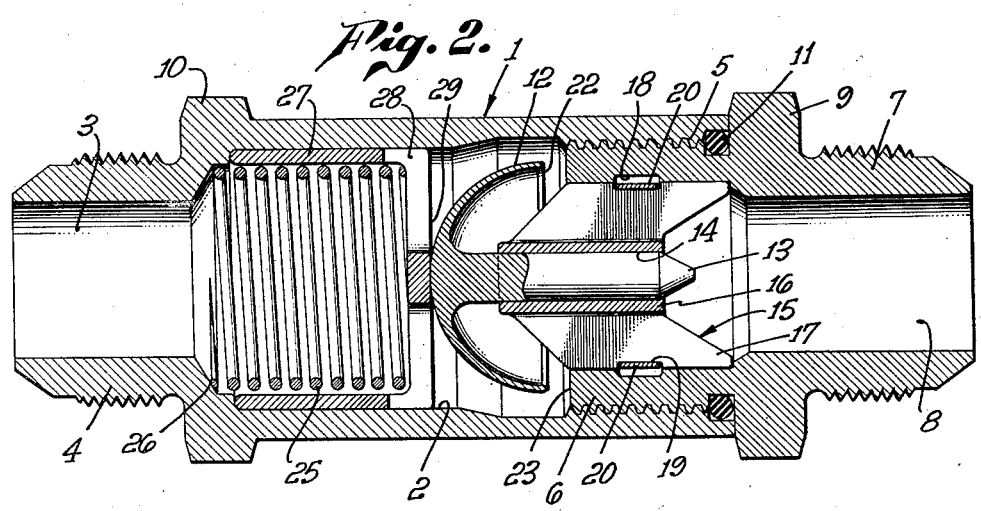
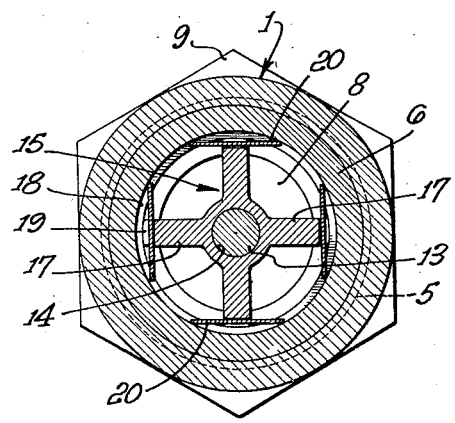
INVENTOR.
ALEX BERTEA,
BY
ATTORNEY.

INVENTOR.
ALEX BERTEA,
BY
ATTORNEY.

Patented Aug. 24, 1948

2,447,729

UNITED STATES PATENT OFFICE 2,447,729

CHECK VALVE

Alex Bertea, Pasadena, Calif.

Application May 5, 1945, Serial No. 592,175

2 Claims. (Cl. 251—144)

My invention relates to check valves and has particular reference to a check valve to be employed in a hydraulic line subjected to great fluctuations in pressure.

In many hydraulic installations, particularly in aircraft, it is necessary to provide a check valve which will insure holding fluid in a part of the hydraulic line even though the pressure in the hydraulic system may fluctuate between relatively great limits. For example, in more recent aircraft constructions required in hydraulic systems employed on the plane, the working pressures may be as high as 3000 to 4000 pounds per square inch and it is essential that a check valve employed in such a line must seal with sufficient accuracy as to leak but one or two drops per minute and yet the check valve must be capable of opening under a pressure differential of only a few pounds, some installations requiring opening of the valve upon a pressure differential of 5 to 8 pounds in a 4000-pound line.

It is therefore an object of my invention to provide a check valve which will satisfy the foregoing specifications.

Another object of my invention is to provide a check valve structure in which the various pieces employed in the assembly may be mass produced and in which assemblies may be made merely by selecting one of each of the desired parts and assembling them together without the necessity of matching any one of the parts with any other one of the parts.

Another object of my invention is to provide a check valve structure of the character described wherein the movable member of the check valve is flexible so as to find its own sealing relation upon a valve seat irrespective of inaccuracies in the machining of either the valve seat or the movable valve member.

Another object of my invention is to provide a check valve of the character described wherein the movable valve member is constructed as a hollow hemisphere, the thickness of the walls of which gradually increases from the sealing edge or equator of the hemisphere to the pole thereof to permit the sealing edge to be thin and flexible while the hemisphere is given adequate strength to resist impacts and high pressure loads.

Another object of my invention is to provide a check valve of the character described wherein the sealing contact between the movable valve member and its associated valve seat is a substantial line contact formed by a substantially knife edge on the movable valve member to thereby make the valve self-clearing of any particles of solid matter which may be in the hydraulic line.

Other objects and advantages of my invention will be apparent from a study of the following specifications, read in connection with the accompanying drawings, wherein Fig. 1 is a longitudinal sectional view taken through a check valve assembly constructed in accordance with my invention and illustrating the position of the parts when the valve is closed;

Fig. 2 is a longitudinal sectional view similar to Fig. 1 but illustrating the position of the parts when the valve is open;

Fig. 3 is a transverse sectional view taken along line III—III of Fig. 1;

Figure 4:
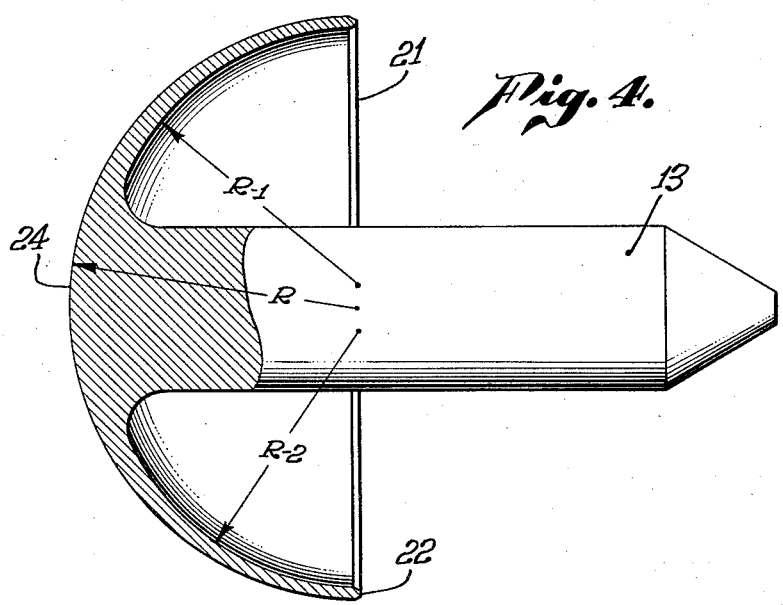
Fig. 4 is an enlarged detail view, partly in section, of the movable valve member employed in my check valve assembly.

Referring to the drawings, I have illustrated in Fig. 1 a check valve assembly in which a check valve body 1 is constructed as a hollow cylindrical shell having a relatively large internal bore 2 communicating with a fluid outlet passage 3 formed through a threaded boss 4 projecting longitudinally from one end of the body 1 for connection to a hydraulic line by means of the standard connection fittings employed in such lines. Adjacent the opposite end of the body 1 the body is threaded, as indicated at 5, for the reception therein of a valve seat member 6 likewise constructed as a hollow cylinder having external threads, the valve seat member 6 being preferably a part of a coupling member 7 through which a fluid inlet passage 8 communicates with the internal bore of the seat member 6. The coupling member is threaded for connection to standard pipe line fittings.

Between the coupling member 7 and the seat member 6 there is formed a non-circular radially extending flange 9 adapted to be entered by wrenches when the seat member 6 and body 1 are to be assembled together and when the check valve assembly is to be connected to the pipe line fittings. A similar non-circular flange 10 is formed upon the body 1 for the same purpose.

An effective seal between the valve seat member and the body may be provided by an O-ring seal 11 disposed in complementary recesses formed in the end of the body member and in the valve seat member, as indicated in the drawings.

The movable valve member 12 which cooperates with the valve seat member 6 is illustrated as comprising a hollow hemisphere from the pole of which extends a stem 13 directed inwardly of the hollow hemisphere and to be received in and guided by a guide bore 14 formed in a cage member 15.

Figure 5:
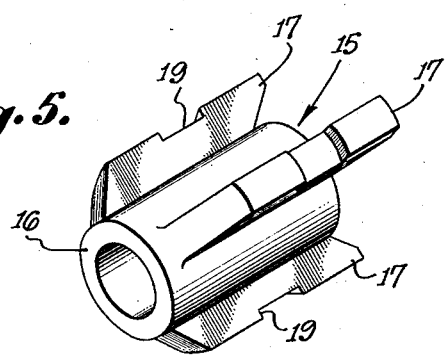
Fig. 5 is a detail perspective view of the spider employed to guide the movable valve member.

The spider member 15 is preferably constructed as shown in Figs. 1, 3 and 5 with an elongated tubular portion 16 from which extends a plurality of radial wings 17 adapted to fit the internal walls of the bore extending through the valve seat member 6, the wings and tubular portion in effect forming a spider centering the guide bore 14 relative to the valve seat member 6. For convenience in manufacture and assembly, I form the guide 15 as a separate metal piece and assemble the same in place within the valve seat member 6 as by forming an annular groove 18 about the valve seat member bore and I form notches 19 in each of the wings alignable with the groove whereby a flat thin spring 20 (see Fig. 3) placed in each of the notches will permit their insertion with the guide into the valve seat member bore, the guide 15 being then pressed into the bore until the ends of the springs are aligned with and snap out into the groove 18.

By referring particularly to Figs. 1 and 4, it will be noted that the movable valve member 12 is formed with a relatively knife-like edge 21 at the equator of the hemispere, the metal adjacent the edge being tapered inwardly and outwardly, preferably at equal angles so as to dispose the edge 21 approximately at the center of the thickness of the wall of the hemisphere adjacent the edge. The extreme edge 21 is flattened slightly as indicated at 22 so as to provide sufficient area of contact surface adapted to abut upon the plane surface 23 of the valve seat member 6 to prevent undue wear between the valve seat surface 23 and the edge 21.

Again by referring particularly to Fig. 4, it will be observed that the wall thickness adjacent the edge 21 is relatively small and that the wall thickness gradually increases as it approaches the pole 24 of the hemisphere to thereby balance out any distortion of the neutral line of resistance to collapsing forces. This may be readily accomplished by forming the external surface of the hemisphere upon one radius R and by forming the interior surfaces of shorter radii R—1 and R—2, the centers of which are offset from the center line of the stem 13 by equal distances but in the same transverse plane as the center of the radius R. This construction provides relatively great strength adjacent the pole 24 to resist bursting pressures and impact forces but permits considerable flexibility of the walls of the hemisphere adjacent the seating edge 21.

It will be understood that other shapes may be employed so long as the primary factors of strength at the pole and flexibility at the equator are maintained and while other external shapes may be used the hemispherical external shape presents the best shape adapted to distribute pressure forces exerted upon the movable member and to resist collapse under great pressures.

The structure thus far described provides a check valve in which the seal between the movable valve member and the valve seat member is made along a substantially line contact area and between a relatively flexible seating surface upon the movable valve member which may be slightly distorted or flexed to make an adequate seal upon the seating surface 23 even though there may be a slight variance between the plane of the seating surface 23 and the seating surface 21 due to minor errors in machining. In other words, the movable valve member and the valve seat member may be manufactured as separate items and merely assembled together, the flexibility of the movable valve member automatically adapting itself to any valve seat member with which it is associated and avoiding the necessity of grinding or lapping of the members together.

Figure 6:
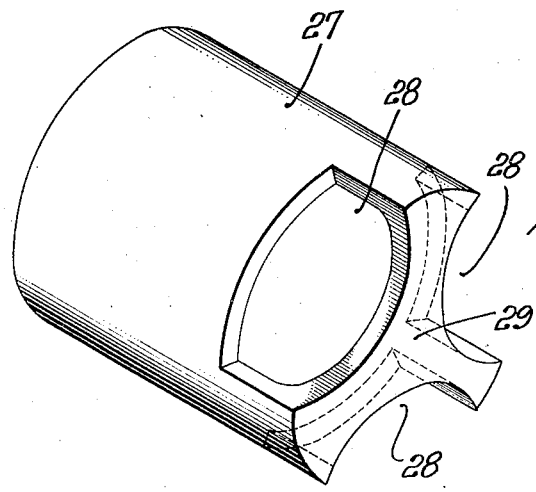
Fig. 6 is a detail perspective view of the cage employed to guide a compression spring employed in my valve assembly.

To hold the check valve in its closed position when pressures exerted upon the movable valve member are small, I provide a spring 25 in the valve body 1, one end of which bears against a shoulder 26 on the body member 1 while the opposite end of which extends into a spring cage 27 formed as indicated in Figs. 1 and 6 as a tubular member having one end open and the other end milled away as indicated at 28 to provide a contact surface 29 engageable with the pole of the hemisphere of the movable valve member 12 but providing ample passage through the milled out portions 28 for the flow of fluid through the check valve assembly. Again it should be noted that the spring cage 27 is not required to make an accurate fit within the bore 2 of the valve body 1 but is preferably loose therein and hence tolerances of machining the bore 2 and the spring cage 27 may be considerable.

With the check valve assembled as indicated in Figs. 1 and 2, it will be apparent that flow is readily permitted in the direction of the arrow in Fig. 1, only a minute amount of movement of the movable valve member 12 away from its seat providing adequate passage for the flow of fluids through the assembly while immediately upon cessation of flow the spring 25 and the back pressure accumulated on the down stream side of the movable valve member will close the check valve. Upon closing, the sealing edge of the hemispherical valve member flexes to assume a fluid-tight seal upon the seating surface 23. Any particle of solid matter which may be in the fluid and may have been deposited upon the seating surface 23 will be shifted by the knife-like edge 21 out of the area of sealing contact or, if it is exactly in alignment with the center of the wall thickness of the hemisphere, the knife-like edge 21 will cut through it, insuring adequate closing and sealing of the valve. Thus the valve is substantially self-cleaning and can be depended upon to make a fluid-tight seal under adverse conditions.

By properly selecting the material from which the hemisphere is made and by utilizing reasonable engineering in the design of the interior shape of the hemisphere to provide adequate wall thickness, the valve is adapted to withstand extremely great pressures. One valve of the type shown was tested under 75,000 pounds pressure without rupture. By selecting a relatively light spring 27, the pressure differential required for the opening of the valve may be maintained at extremely low values.

It should be noted that the frictional support afforded to the movable valve member at all times, by the spring at one of its ends and by the stem and guide at the other of its ends, makes the valve non-chattering when in use.

While I have shown and described the preferred embodiment of my invention, I do not desire to be limited to any of the details of construction shown or described herein, except as defined in the appended claims.

I claim:

1. In a check valve structure, a body member having a longitudinal bore extending therethrough, a valve seat member disposed in said bore comprising an annular seating surface disposed in a plane normal to the longitudinal axis of said bore, a movable valve member comprising a hollow hemisphere disposed with its exterior surface exposed to the down stream side of said valve structure, means for guiding said movable valve member toward and away from said valve seat to cause the movable valve member to make sealing contact with said valve seat along the equator of said hemisphere, and spring means normally urging said movable valve member into engagement with said valve seat.

2. In a check valve structure, a body member having a longitudinal bore extending therethrough, a valve seat member disposed in said bore comprising an annular seating surface disposed in a plane normal to the longitudinal axis of said bore, a movable valve member comprising a hollow hemisphere disposed with its exterior surface exposed to the down stream side of said valve structure, means for guiding said movable valve member toward and away from said valve seat to cause the movable valve member to make sealing contact with said valve seat along the equator of said hemisphere, a helical spring disposed in said body bore on the down stream side of the movable valve member, and a spring cage surrounding one end of said spring and having a portion extending transversely of said bore to engage the pole of the hemisphere defined by said movable valve member.

ALEX BERTEA.

REFERENCES CITED

The following references are of record in the file of this patent:

UNITED STATES PATENTS

| Number | Name | Date |
| --- | --- | --- |
| 125,371 | Windhausen | Apr. 2, 1872 |
| 455,633 | Messinger | July 7, 1891 |
| 854,393 | Wirt | May 21, 1907 |
| 1,603,834 | Boynton | Oct. 19, 1926 |
| 1,756,056 | Dorward | Apr. 29, 1930 |
| 1,817,941 | Rockwell | Aug. 11, 1931 |
| 2,386,726 | Tannehill | Oct. 9, 1945 |

FOREIGN PATENTS

| Number | Country | Date |
| --- | --- | --- |
| 414,596 | Great Britain | Aug. 9, 1934 |